United States Patent
Iashyn et al.

(10) Patent No.: US 10,742,516 B1
(45) Date of Patent: Aug. 11, 2020

(54) KNOWLEDGE AGGREGATION FOR GAN-BASED ANOMALY DETECTORS

(71) Applicant: Cisco Technology, Inc., San Jose, CA (US)

(72) Inventors: Volodymyr Iashyn, Brussels (BE); Borys Viacheslavovych Berlog, Brussels (BE); Dmitri Goloubev, Waterloo (BE)

(73) Assignee: CISCO TECHNOLOGY, INC., San Jose, CA (US)

( * ) Notice: Subject to any disclaimer, the term of this patent is extended or adjusted under 35 U.S.C. 154(b) by 10 days.

(21) Appl. No.: 16/268,853

(22) Filed: Feb. 6, 2019

(51) Int. Cl.
  *G06K 9/62* (2006.01)
  *H04L 12/24* (2006.01)
  *G06N 20/00* (2019.01)
  *H04L 29/08* (2006.01)

(52) U.S. Cl.
  CPC .......... *H04L 41/14* (2013.01); *G06N 20/00* (2019.01); *H04L 67/10* (2013.01); *H04L 67/12* (2013.01)

(58) Field of Classification Search
  CPC ......... H04L 41/14; H04L 67/12; H04L 67/10; G06N 20/00
  See application file for complete search history.

(56) References Cited

U.S. PATENT DOCUMENTS

| | | |
|---|---|---|
| 10,063,578 B2 | 8/2018 | Flacher et al. |
| 2014/0222730 A1* | 8/2014 | Vasseur .............. H04L 67/1029 706/12 |
| 2015/0193693 A1* | 7/2015 | Vasseur .............. H04L 43/0876 706/12 |
| 2015/0193695 A1* | 7/2015 | Cruz Mota ............. G06N 3/08 706/12 |
| 2015/0193696 A1* | 7/2015 | Vasseur .............. H04L 43/0876 706/12 |
| 2016/0217387 A1 | 7/2016 | Okanohara et al. |
| 2016/0352766 A1* | 12/2016 | Flacher .............. H04L 63/1425 |
| 2017/0034016 A1* | 2/2017 | Carroll ............... H04L 41/0813 |
| 2018/0293734 A1 | 10/2018 | Lim et al. |
| 2020/0090002 A1* | 3/2020 | Zhu ....................... G06K 9/629 |

FOREIGN PATENT DOCUMENTS

CN 108009058 5/2018

OTHER PUBLICATIONS

Salimans et al., "Improved Techniques for Training GANs," Nips Proceedings 2018, Dec. 5-10, 2016, pp. 1-9.

* cited by examiner

*Primary Examiner* — Philip J Chea
*Assistant Examiner* — Wuju Chen
(74) *Attorney, Agent, or Firm* — POLSINELLI PC

(57) ABSTRACT

Systems, methods, and computer-readable media for distributing machine learning. In some examples, a first GAN model is deployed to a first network edge device and a second GAN model is deployed to a second network edge device. A generator of the first GAN model can be trained using real telemetry data of a first computing node and a generator of the second GAN model can be trained using real telemetry data of a second IoT device. The generator of the first GAN model and the generator of the second GAN model can be received. Additionally, a unified generator of a unified GAN model can be trained using the generator of the first GAN model and the generator of the second GAN model. Subsequently, the unified GAN model can be deployed to a third computing node for monitoring operation of the third IoT device.

17 Claims, 12 Drawing Sheets

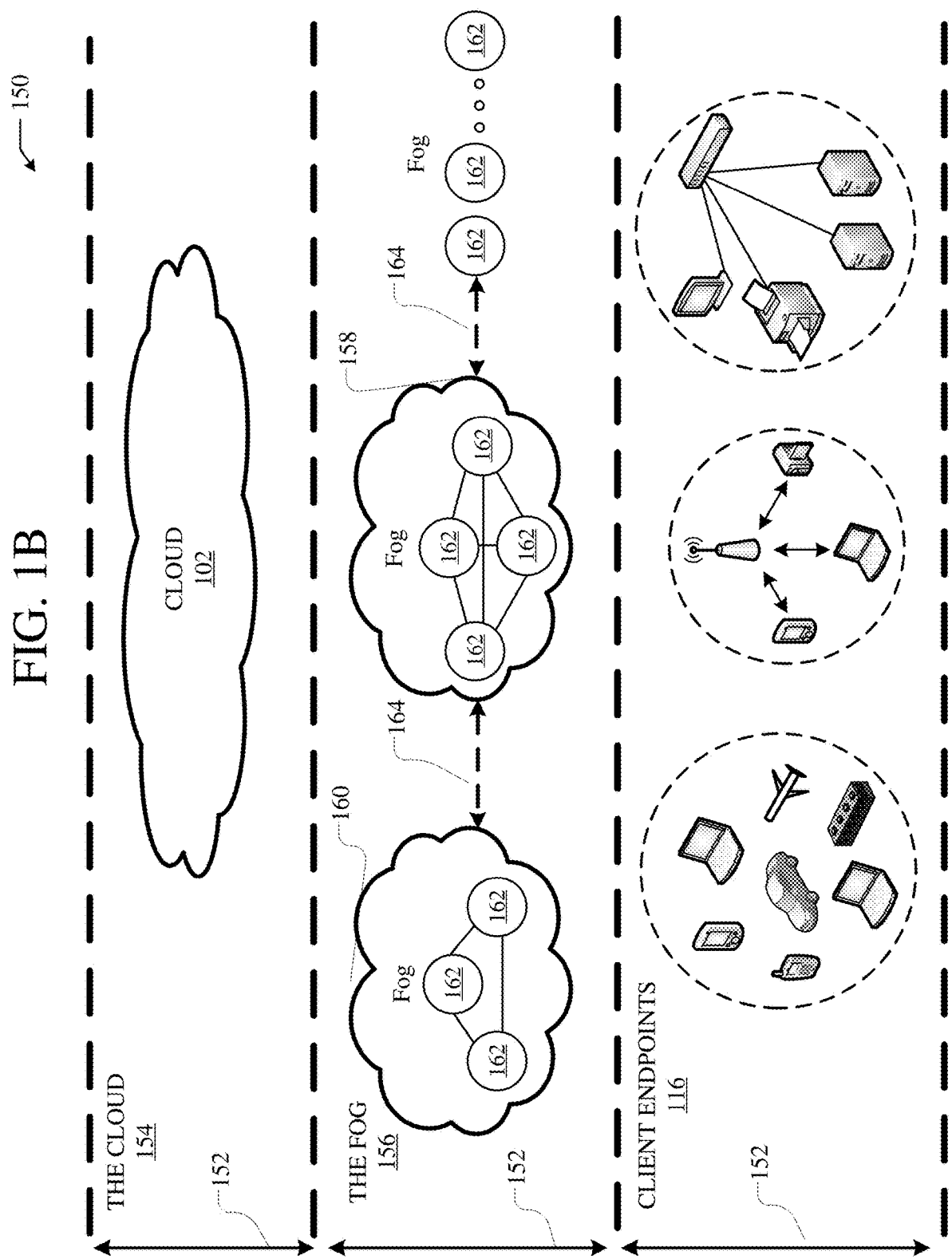

FIG. 7A
FIG. 7B
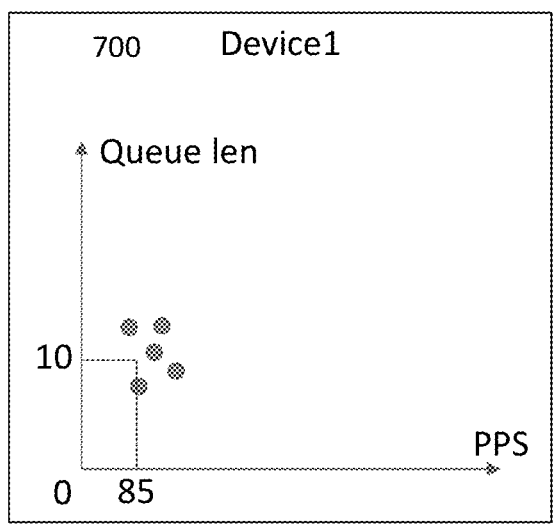
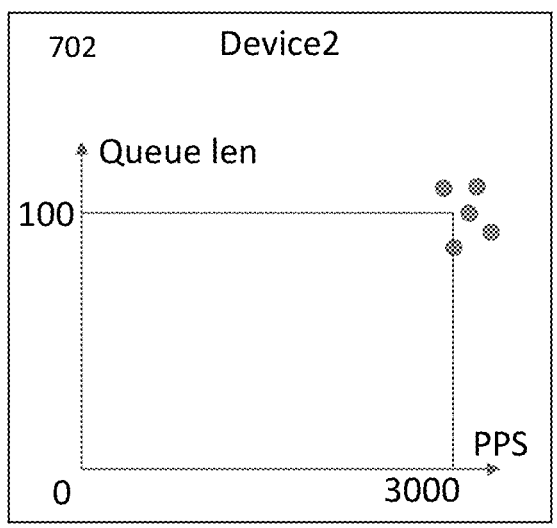

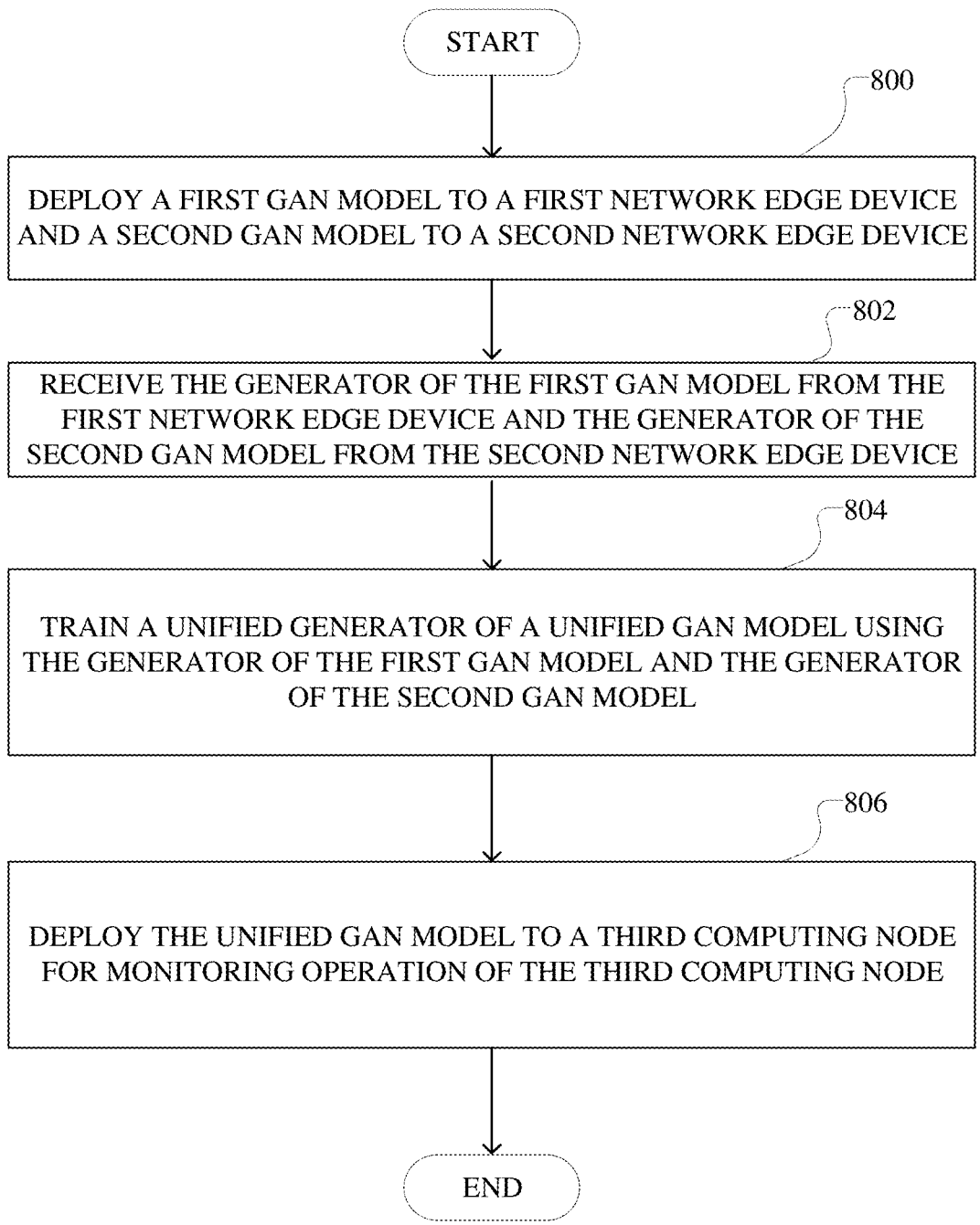

US 10,742,516 B1

KNOWLEDGE AGGREGATION FOR GAN-BASED ANOMALY DETECTORS

TECHNICAL FIELD

The present technology pertains to distributing machine learning for performing network monitoring to network edge devices, and in particular to distributing generative adversarial network (GAN) model training to network edge devices for computing node, e.g. Internet of Things (IoT) device, network monitoring.

BACKGROUND

Typical machine learning involves a large number of computations that consume a large number of computational resources. When machine learning is applied to monitor large scale networks, immense amounts of computational resources are utilized. Specifically, as cheaper and more attainable computing nodes, e.g. IoT devices, are more widely adopted, networks continue to grow in size and complexity. In turn, this makes utilizing machine learning to monitor computing nodes in such networks difficult as a result of the large number of computational resources needed to actually monitor the computing nodes using machine learning.

Further, machine learning is typically applied to monitor networks from a centralized location or a centralized computational resource group, e.g. the cloud. As discussed previously, monitoring complex networks through machine learning requires large numbers of computational resources, making centralized implementation of network monitoring using machine learning extremely challenging. For example, the overhead of moving large amounts of data needed to monitor networks centrally using machine learning is vast making such implementation infeasible. There therefore exist needs for systems and methods of distributing computational resources for performing network monitoring using machine learning away from a central region. Specifically, there exist needs for distributing network monitoring through machine learning to computational resources at the edges of a network.

Additionally, telemetry data from computing nodes is typically used to monitor networks using machine learning. This is problematic when the networks are monitored from a centralized location. In particular, the telemetry data is sent from the computing nodes away from the edge of the network, potentially exposing the telemetry data. This presents security concerns that often preclude device owners from sharing telemetry data with outside parties. In turn, this makes applying machine learning to monitor networks problematic, as often times monitoring networks using machine learning is accomplished with telemetry data describing device behavior that is generated at or near the devices. There therefore exist needs for systems and methods of sending data describing computing node behavior away from a network edge, e.g. a LAN, without actually exposing telemetry data of the computing nodes.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 1B illustrates an example fog computing architecture;

FIG. 7A illustrates a data graph of a generator combined to form virtual telemetry data for training a unified GAN model;

FIG. 7B illustrates another data graph of a generator combined to form virtual telemetry data for training a unified GAN model;

FIG. 8 illustrates a flowchart for an example method of distributing machine learning to a network edge;

DESCRIPTION OF EXAMPLE EMBODIMENTS

Figure 1A:
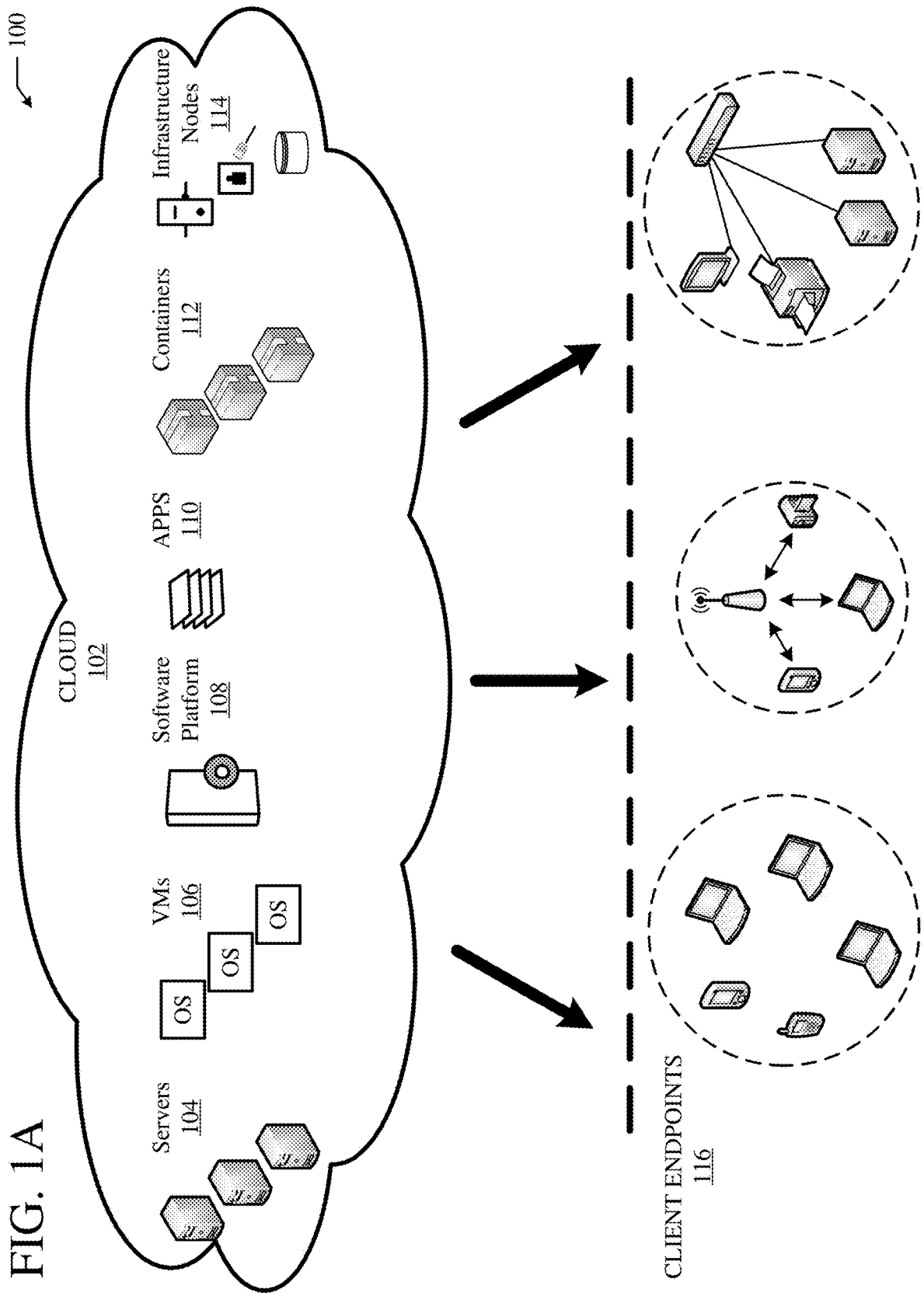
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

A method can include deploying a first GAN model to a first network edge device and deploying a second GAN model to a second network edge device. A generator of the first GAN model can be trained using real telemetry data of a first computing node and a generator of the second GAN model can be trained using real telemetry data of a second computing node. The method can also include receiving, from the first network edge device, the generator of the first GAN model and receiving, from the second network edge device, the generator of the second GAN model. Additionally, the method can include training a unified generator of a unified GAN model using the generator of the first GAN model and the generator of the second GAN model. The method can include deploying the unified GAN model to a third computing node for monitoring operations of the third computing node.

A system can include one or more processors and at least one computer-readable storage medium storing instructions which, when executed by the one or more processors, cause the one or more processors to deploy a first GAN model to a first network edge device and a second GAN model to a second network edge device. A generator of the first GAN model can be trained using real telemetry data of a first computing node and a generator of the second GAN model can be trained using real telemetry data of a second computing node. The instructions can also cause the one or more processors to receive, from the first network edge device, the generator of the first GAN model and receive, from the second network edge device, the generator of the second GAN model. Further, the instructions can cause the one or more processors to train a unified generator of a unified GAN model using the generator of the first GAN model and the generator of the second GAN model.

A non-transitory computer-readable storage medium having stored therein instructions which, when executed by a processor, cause the processor to deploy a first GAN model to a first network edge device and a second GAN model to a second network edge device. A generator of the first GAN model can be trained using real telemetry data of a first IoT device and a generator of the second GAN model can be trained using real telemetry data of a second IoT device. The instructions can cause the processor to receive, from the first network edge device, the generator of the first GAN model and receive, from the second network edge device, the generator of the second GAN model. Further, the instructions can cause the processor to train a unified generator of a unified GAN model using the generator of the first GAN model and the generator of the second GAN model. The instructions can also cause the processor to deploy the unified GAN model to a third IoT device for detecting anomalies during operation of the third IoT device.

EXAMPLE EMBODIMENTS

The disclosed technology addresses the need in the art for distributing network monitoring through machine learning to edges of a network. Additionally, the disclosed technology address the need in the art for performing network monitoring of computing nodes using machine learning without actually exposing telemetry data of the computing nodes outside of a network edge. The present technology involves system, methods, and computer-readable media for distributing network monitoring through machine learning to edges of a network. Additionally, the present technology involves systems, methods, and computer-readable media for performing network monitoring of computing nodes without exposing telemetry data of the computing nodes outside of a network edge.

Figure 9:
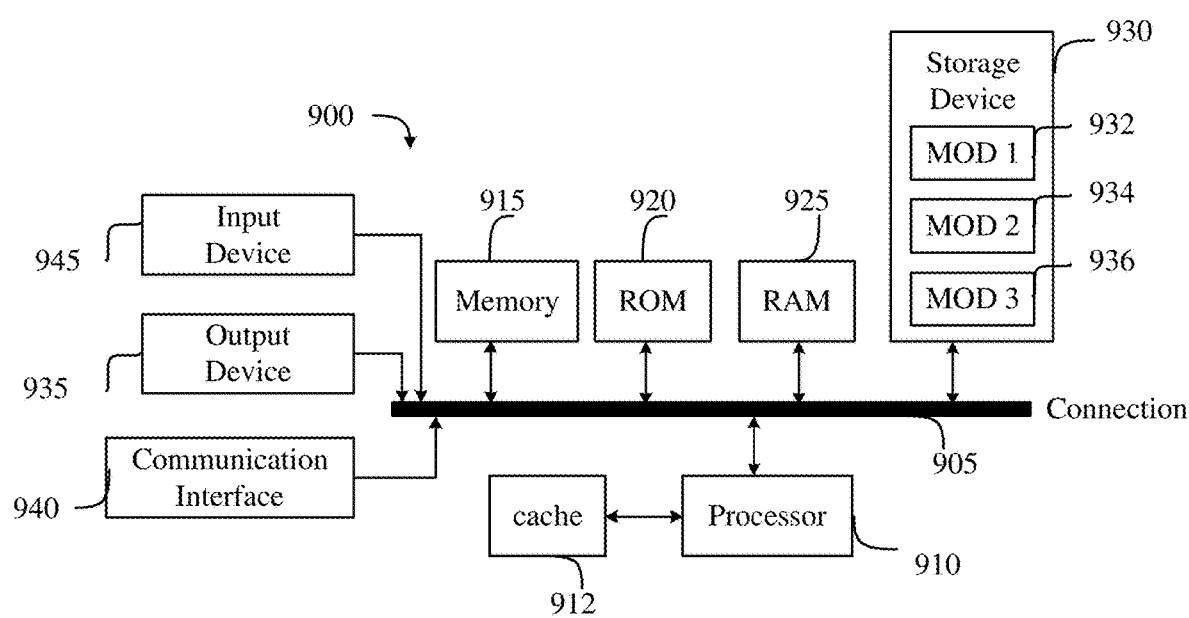
FIG. 9 illustrates an example computing system.
Figure 10:
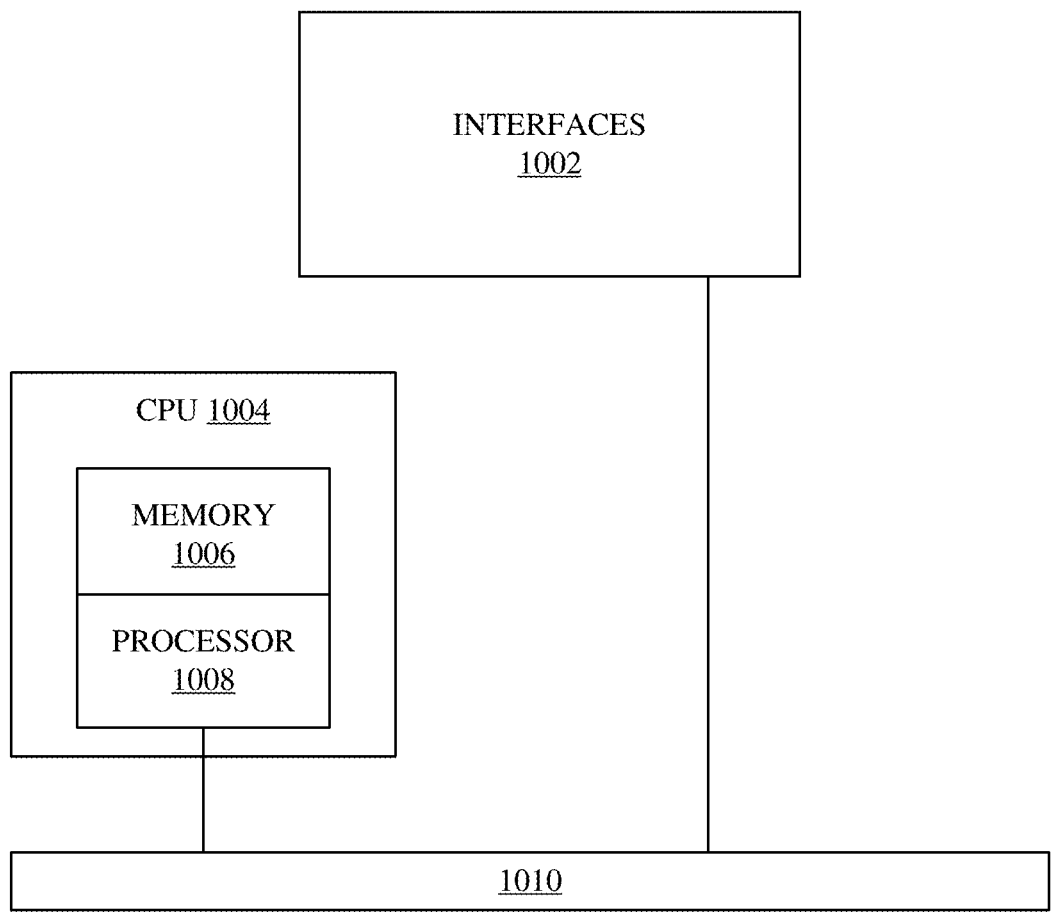
FIG. 10 illustrates an example network device.

A description of network environments and architectures for network data access and services, as illustrated in FIGS. 1A, 1B, 2A, 2B is first disclosed herein. A discussion of systems, methods, and computer-readable medium for distributing machine learning to network edge devices, as shown in FIGS. 3-8, will then follow. The discussion then concludes with a brief description of example devices, as illustrated in FIGS. 9 and 10. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can be used to form part of a TCP connection or otherwise be accessed through the TCP connection. Specifically, the cloud 102 can include an initiator or a receiver of a TCP connection and be utilized by the initiator or the receiver to transmit and/or receive data through the TCP connection. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of an example fog computing architecture 150. The fog computing architecture can be used to form part of a TCP connection or otherwise be accessed through the TCP connection. Specifically, the fog computing architecture can include an initiator or a receiver of a TCP connection and be utilized by the initiator or the receiver to transmit and/or receive data through the TCP connection. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network (s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2A:
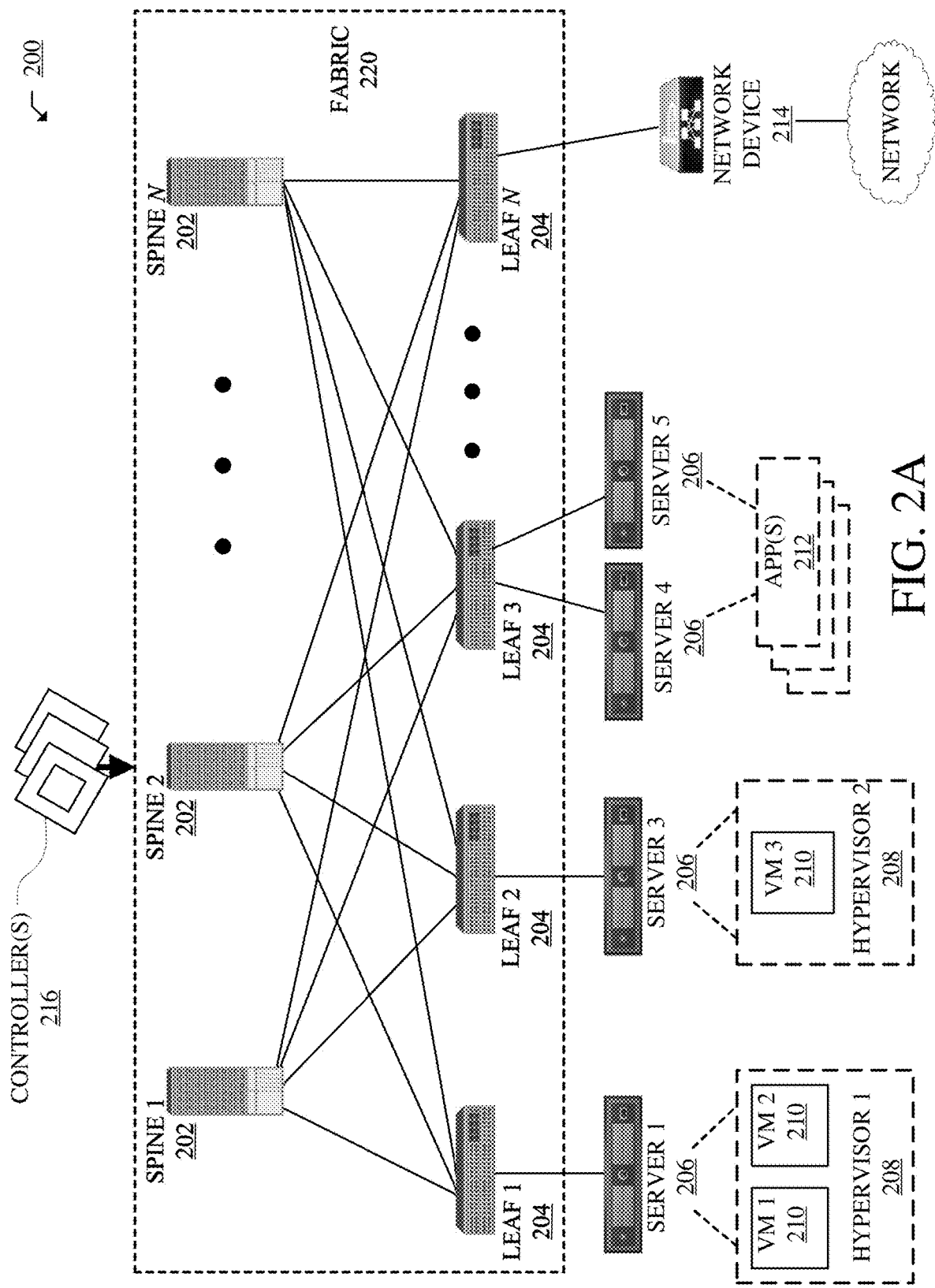
FIG. 2A illustrates a diagram of an example network environment, such as a data center.

FIG. 2A illustrates a diagram of an example Network Environment 200, such as a data center. The Network Environment 200 can be used to support a TCP connection for exchanging data between an initiator and a receiver. In some cases, the Network Environment 200 can include a data center, which can support and/or host the cloud 102. The Network Environment 200 can include a Fabric 220 which can represent the physical layer or infrastructure (e.g., underlay) of the Network Environment 200. Fabric 220 can include Spines 202 (e.g., spine routers or switches) and Leafs 204 (e.g., leaf routers or switches) which can be interconnected for routing or switching traffic in the Fabric 220. Spines 202 can interconnect Leafs 204 in the Fabric 220, and Leafs 204 can connect the Fabric 220 to an overlay or logical portion of the Network Environment 200, which can include application services, servers, virtual machines, containers, endpoints, etc. Thus, network connectivity in the Fabric 220 can flow from Spines 202 to Leafs 204, and vice versa. The interconnections between Leafs 204 and Spines 202 can be redundant (e.g., multiple interconnections) to avoid a failure in routing. In some embodiments, Leafs 204 and Spines 202 can be fully connected, such that any given Leaf is connected to each of the Spines 202, and any given Spine is connected to each of the Leafs 204. Leafs 204 can be, for example, top-of-rack ("ToR") switches, aggregation switches, gateways, ingress and/or egress switches, provider edge devices, and/or any other type of routing or switching device.

Leafs 204 can be responsible for routing and/or bridging tenant or customer packets and applying network policies or rules. Network policies and rules can be driven by one or more Controllers 216, and/or implemented or enforced by one or more devices, such as Leafs 204. Leafs 204 can connect other elements to the Fabric 220. For example, Leafs 204 can connect Servers 206, Hypervisors 208, Virtual Machines (VMs) 210, Applications 212, Network Device 214, etc., with Fabric 220. Such elements can reside in one or more logical or virtual layers or networks, such as an overlay network. In some cases, Leafs 204 can encapsulate and decapsulate packets to and from such elements (e.g., Servers 206) in order to enable communications throughout Network Environment 200 and Fabric 220. Leafs 204 can also provide any other devices, services, tenants, or workloads with access to Fabric 220. In some cases, Servers 206 connected to Leafs 204 can similarly encapsulate and decapsulate packets to and from Leafs 204. For example, Servers 206 can include one or more virtual switches or routers or tunnel endpoints for tunneling packets between an overlay or logical layer hosted by, or connected to, Servers 206 and an underlay layer represented by Fabric 220 and accessed via Leafs 204.

Applications 212 can include software applications, services, containers, appliances, functions, service chains, etc. For example, Applications 212 can include a firewall, a database, a CDN server, an IDS/IPS, a deep packet inspection service, a message router, a virtual switch, etc. An application from Applications 212 can be distributed, chained, or hosted by multiple endpoints (e.g., Servers 206, VMs 210, etc.), or may run or execute entirely from a single endpoint.

VMs 210 can be virtual machines hosted by Hypervisors 208 or virtual machine managers running on Servers 206. VMs 210 can include workloads running on a guest operating system on a respective server. Hypervisors 208 can provide a layer of software, firmware, and/or hardware that creates, manages, and/or runs the VMs 210. Hypervisors 208 can allow VMs 210 to share hardware resources on Servers 206, and the hardware resources on Servers 206 to appear as multiple, separate hardware platforms. Moreover, Hypervisors 208 on Servers 206 can host one or more VMs 210.

In some cases, VMs 210 and/or Hypervisors 208 can be migrated to other Servers 206. Servers 206 can similarly be migrated to other locations in Network Environment 200. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 206, Hypervisors 208, and/or VMs 210 can represent or reside in a tenant or customer space. Tenant space can include workloads, services, applications, devices, networks, and/or resources that are associated with one or more clients or subscribers. Accordingly, traffic in Network Environment 200 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 216, Servers 206, Leafs 204, etc.

Configurations in Network Environment 200 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through Controllers 216, which can implement or propagate such configurations through Network Environment 200. In some examples, Controllers 216 can be Application Policy Infrastructure Controllers (APICs) in an ACI framework. In other examples, Controllers 216 can be one or more management components for associated with other SDN solutions, such as NSX Managers.

Such configurations can define rules, policies, priorities, protocols, attributes, objects, etc., for routing and/or classifying traffic in Network Environment 200. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 200, such as Leafs 204, Servers 206, Hypervisors 208, Controllers 216, etc. As previously explained, Network Environment 200 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 200. Endpoints can have one or more attributes such as a VM name, guest OS name, a security tag, application profile, etc. Application configurations can be applied between EPGs, instead of endpoints directly, in the form of contracts. Leafs 204 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by Application Virtual Switches (AVS), which can run on a host, such as a server or switch. For example, an AVS can classify traffic based on specified attributes, and tag packets of different attribute EPGs with different identifiers, such as network segment identifiers (e.g., VLAN ID). Finally, Leafs 204 can tie packets with their attribute EPGs based on their identifiers and enforce policies, which can be implemented and/or managed by one or more Controllers 216. Leaf 204 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 2A, Network Environment 200 can deploy different hosts via Leafs 204, Servers 206, Hypervisors 208, VMs 210, Applications 212, and Controllers 216, such as VMWARE ESXi hosts, WINDOWS HYPER-V hosts, bare metal physical hosts, etc. Network Environment 200 may interoperate with a variety of Hypervisors 208, Servers 206 (e.g., physical and/or virtual servers), SDN orchestration platforms, etc. Network Environment 200 may implement a declarative model to allow its integration with application design and holistic network policy.

Controllers 216 can provide centralized access to fabric information, application configuration, resource configuration, application-level configuration modeling for a software-defined network (SDN) infrastructure, integration with management systems or servers, etc. Controllers 216 can form a control plane that interfaces with an application plane via northbound APIs and a data plane via southbound APIs.

As previously noted, Controllers 216 can define and manage application-level model(s) for configurations in Network Environment 200. In some cases, application or device configurations can also be managed and/or defined by other components in the network. For example, a hypervisor or virtual appliance, such as a VM or container, can run a server or management tool to manage software and services in Network Environment 200, including configurations and settings for virtual appliances.

As illustrated above, Network Environment 200 can include one or more different types of SDN solutions, hosts, etc. For the sake of clarity and explanation purposes, various examples in the disclosure will be described with reference to an ACI framework, and Controllers 216 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 206 (e.g., physical or logical), Hypervisors 208, VMs 210, containers (e.g., Applications 212), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

Figure 2B:
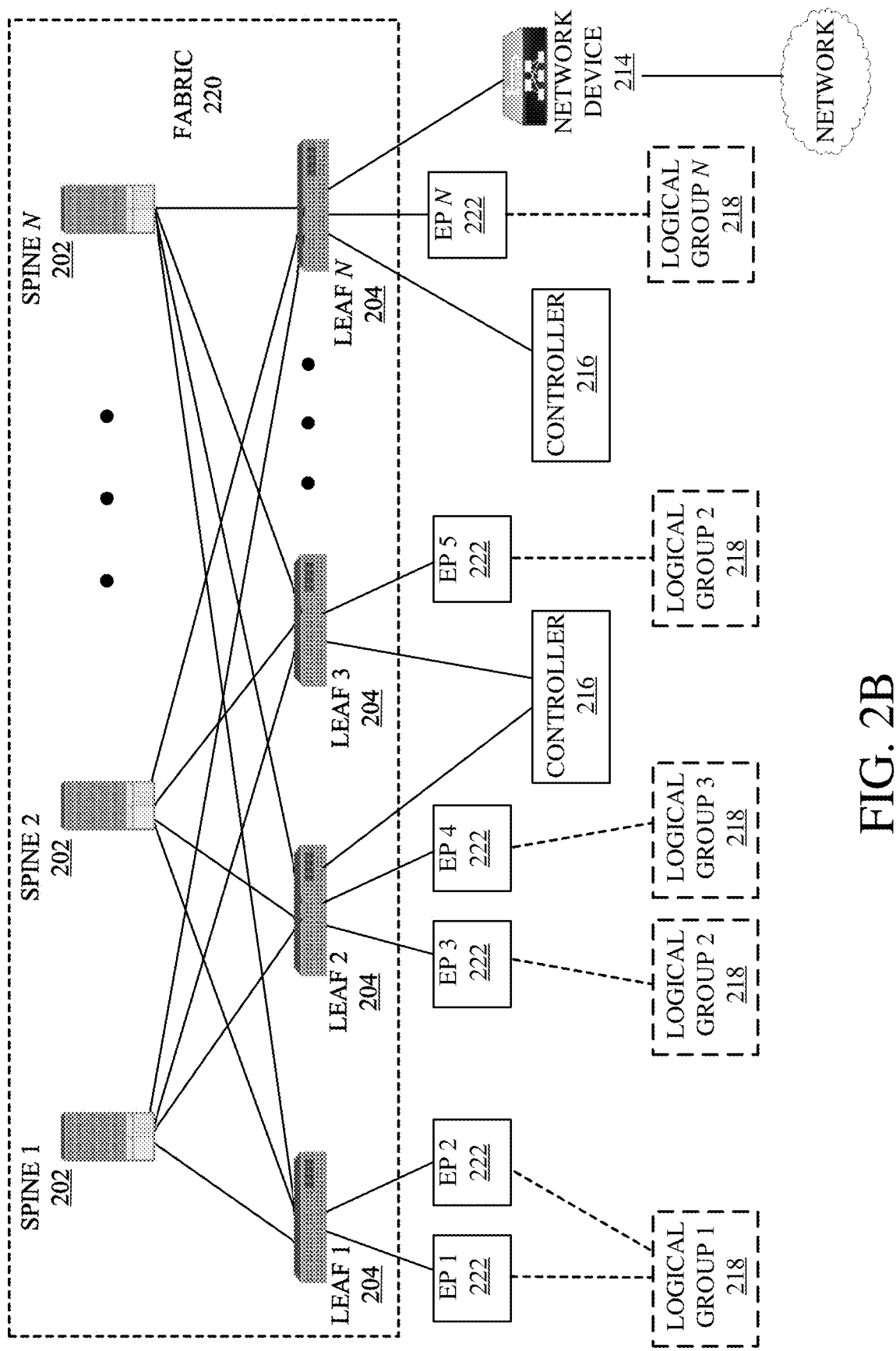
FIG. 2B illustrates another example of a network environment.

FIG. 2B illustrates another example of Network Environment 200. In this example, Network Environment 200 includes Endpoints 222 connected to Leafs 204 in Fabric 220. Endpoints 222 can be physical and/or logical or virtual entities, such as servers, clients, VMs, hypervisors, software containers, applications, resources, network devices, workloads, etc. For example, an Endpoint 222 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 222 can be associated with respective Logical Groups 218. Logical Groups 218 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 218 are EPGs in an ACI environment and/or other logical groups (e.g., SGs) in another SDN environment.

Traffic to and/or from Endpoints 222 can be classified, processed, managed, etc., based Logical Groups 218. For example, Logical Groups 218 can be used to classify traffic to or from Endpoints 222, apply policies to traffic to or from Endpoints 222, define relationships between Endpoints 222, define roles of Endpoints 222 (e.g., whether an endpoint consumes or provides a service, etc.), apply rules to traffic to or from Endpoints 222, apply filters or access control lists (ACLs) to traffic to or from Endpoints 222, define communication paths for traffic to or from Endpoints 222, enforce requirements associated with Endpoints 222, implement security and other configurations associated with Endpoints 222, etc.

In an ACI environment, Logical Groups 218 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a Web EPG can provide a service that a Client EPG consumes, and that consumption can be subject to a filter (ACL) and a service graph that includes one or more services, such as firewall inspection services and server load balancing.

Typical machine learning involves a large number of computations that consume a large number of computational resources. When machine learning is applied to monitor large scale networks, immense amounts of computational resources are utilized. Specifically, as computing nodes are more widely adopted, networks continue to grow in size and complexity. In turn, this makes utilizing machine learning to monitor computing nodes in such networks difficult as a result of the large number of computational resources needed to actually monitor the computing nodes using machine learning.

Further, machine learning is typically applied to monitor networks from a centralized location or a centralized computational resource group, e.g. the cloud. As discussed previously, monitoring complex networks through machine learning requires large numbers of computational resources, making centralized implementation of network monitoring using machine learning extremely challenging. For example, the overhead of moving large amounts of data needed to monitor networks centrally using machine learning is vast making such implementation infeasible. There therefore exist needs for systems and methods of distributing computational resources for performing network monitoring using machine learning away from a central region. Specifically, there exist needs for distributing network monitoring through machine learning to computational resources at the edges of a network.

Additionally, telemetry data from computing nodes, e.g. IoT devices, is typically used to monitor networks using machine learning. This is problematic when the networks are monitored from a centralized location. In particular, the telemetry data is sent from the computing nodes away from the edge of the network, potentially exposing the telemetry data. This presents security concerns that often preclude device owners from sharing telemetry data with outside parties. In turn, this makes applying machine learning to monitor networks problematic, as often times monitoring networks using machine learning is accomplished with telemetry data describing device behavior that is generated at or near the devices. There therefore exist needs for systems and methods of sending data describing computing node behavior away from a network edge, e.g. a LAN, without actually exposing telemetry data of the computing node.

The present includes systems, methods, and computer-readable mediums for distributing machine learning for performing network monitoring to network edge devices. A first GAN model can be pushed to a first network edge device where a generator of the first GAN model can be trained using real telemetry data of a first computing node. Further a second GAN model can be pushed to a second network edge device where a generator of the second GAN model can be trained using real telemetry data of a second computing node. The generator of the first GAN model can be received from the first network edge device and the generator of the second GAN model can be received from the second network edge device. A unified generator of a unified GAN model can be trained using the generator of the first GAN model and the generator of the second GAN model. Subsequently, the unified GAN model can be deployed to a third computing node for monitoring operation of the third computing node.

Figure 3:
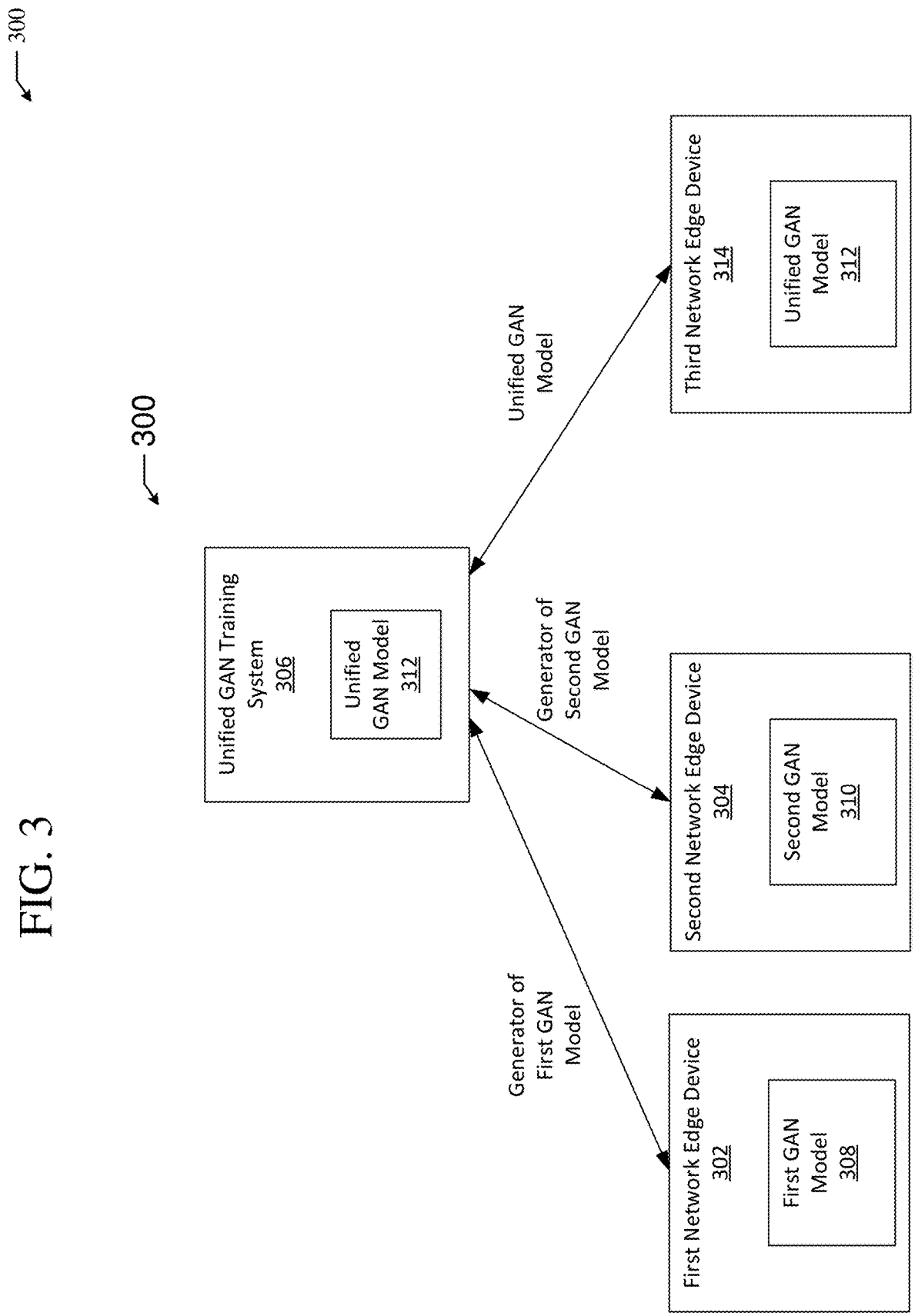
FIG. 3 illustrates an example environment for distributing machine learning to edges of a network for monitoring network devices in the network.

FIG. 3 illustrates an example environment 300 for distributing machine learning to edges of a network for monitoring network devices in the network. The example environment 300 shown in FIG. 3 includes a first network edge device 302 and a second edge network edge device 304. The example environment 300 also includes a unified GAN training system 306. The environment 300, shown in FIG. 3, can be implemented using one or a combination of the environments and architectures shown in FIGS. 1-2. For example, the unified GAN training system 306 can be implemented in an applicable cloud computing architecture, such as the cloud computing architecture 100 shown in FIG. 1A. In another example, either or both the first network edge device 302 and the second network edge device 304 can be implemented in an applicable fog computing architecture, such as the fog computing architecture 150 shown in FIG. 1B.

A network edge device, as used herein, can include an applicable device for providing an entry point into a network. Specifically, a network edge device can include a client device utilized to grant/obtain network service access to a WAN through LAN. For example, a network edge device can include a computing node configured to access network services through the Internet. Further, a network edge device can include a client device/computing node utilized by a user to access network service over the Internet. Additionally, a network edge device can include a device within a WAN that is configured to provide access to the WAN.

A computing node can include an applicable device for performing computational functions, such as a device configured to operate according to the computing system architecture 900 shown in FIG. 9 and the network device 1000 shown in FIG. 10. A computing node, as used herein, can include an IoT device. An IoT device, as used herein, includes an applicable device for sending and/or receiving data over a network. Specifically, an IoT device can include an applicable device for accessing network services through a network, e.g. the Internet. For example, an IoT device can include a desktop computing device, a portable computing device, and other applicable devices that are configured to communicate through a network, e.g. to interview with an external or remote environment.

The first network edge device 302 and the second network edge device 304 can be configured to receive GAN models. Specifically, the first network edge device 302 and the second network edge device 304 can respectively receive a first GAN model 308 and a second GAN model 310. The corresponding GAN models 308 and 310 received at the first network edge device 302 and the second network edge can be utilized, as will be discussed in greater detail later, to monitor network performance of network devices in a network environment. Specifically, the corresponding GAN models 308 and 310 can be utilized to monitor network performance at network edge devices, e.g. computing nodes, in a network. While reference is made to GAN models throughout this description, in various embodiments, an applicable machine learning model can be distributed and used for monitoring performance of network devices in a network.

The unified GAN training system 306 can function to deploy the first GAN model 308 to the first network edge device 302 and the second GAN model 310 to the second network edge device 304. Specifically, the unified GAN training system 306 can be implemented remote from the first network edge device 302 and the second network edge device 304 away from an edge of a network, e.g. in a cloud computing architecture. Subsequently, the unified GAN training system 306 can deploy, from a remote network location where the unified GAN training system 306 is implemented, the first GAN model 308 to the first network edge device 302 and the second GAN model 310 to the second network edge device 304.

The first GAN model 308 can be trained at the first network edge device 302 to create a generator of the first GAN model 308. Additionally, the second GAN model 310 can be trained at the second network edge device 304 to create a generator of the second GAN model 310. As will be discussed in greater detail later, the generator of the first GAN model 308 and the generator of the second GAN model 310 can ultimately be used in monitoring operation of network devices, e.g. network edge devices, in a network.

The first GAN model 308 and the second GAN model 310 can be trained at the corresponding first network edge device 302 and the second network edge device 304 using real telemetry data of computing nodes, e.g. IoT devices. Telemetry data includes applicable data related to operation of computing nodes, e.g. operation in a network environment. For example, if a computing node is a thermostat, then telemetry data can include measured temperatures at the thermostat over time. The first GAN model 308 and the second GAN model 310 can be trained on real telemetry from different computing nodes. For example, the first GAN model 308 can be trained on real telemetry data from a first computing node, while the second GAN model 310 can be trained on real telemetry data from a second computing node different from the first computing node.

The first network edge device 302 can be the same device that generates real telemetry data used to train the first GAN model 308. For example, the first network edge device 302 can be a computing node that generates real telemetry data for training the first GAN model 308 at the computing node. Additionally, the second network edge device 304 can be the same device that generates real telemetry data used to train the second GAN model 310. For example, the second network edge device 304 can be a computing node that generates real telemetry data for training the second GAN model 310 at the second computing node.

Further, the first network edge device 302 can be a different device from a device that generates real telemetry data used to train the first GAN model 308 at the first network edge device 302. For example, the first network edge device 302 can be an access point configured to receive telemetry data from a separate computing node that is used to train the first GAN model 308 at the access point. Similarly, the second network edge device 304 can be a different device from a device that generates real telemetry data used to train the second GAN model 310 at the second network edge device 304. For example, the second network edge device 302 can be a router in an Ethernet backhaul of a LAN configured to receive telemetry data from a separate computing node that is used to train the second GAN model 310 at the router.

All or portions of the first GAN model 308 and the second GAN model 310 can be different. Specifically, the first GAN model 308 and the second GAN model 310 can differ based on characteristics/environmental characteristics of the devices used to train the models 308 and 310. In turn, this can facilitate increased accuracy in training the first GAN model 308 and the second GAN model 310, as the models can be tailored to the specific devices used to train the GAN models 308 and 310. However, this can preclude reusing the trained first GAN model 308 and the trained second GAN model 310 on different devices, even if the devices are the same type as the first network edge device 302 and the second network edge device 304. As will be discussed in greater detail later, a unified GAN model can be generated from the differing first and second GAN models 308 and 310 to eliminate, at least in part, the need for reusing the trained first GAN model 308 and the trained second GAN model 310 on the different network edge devices.

Figure 4:
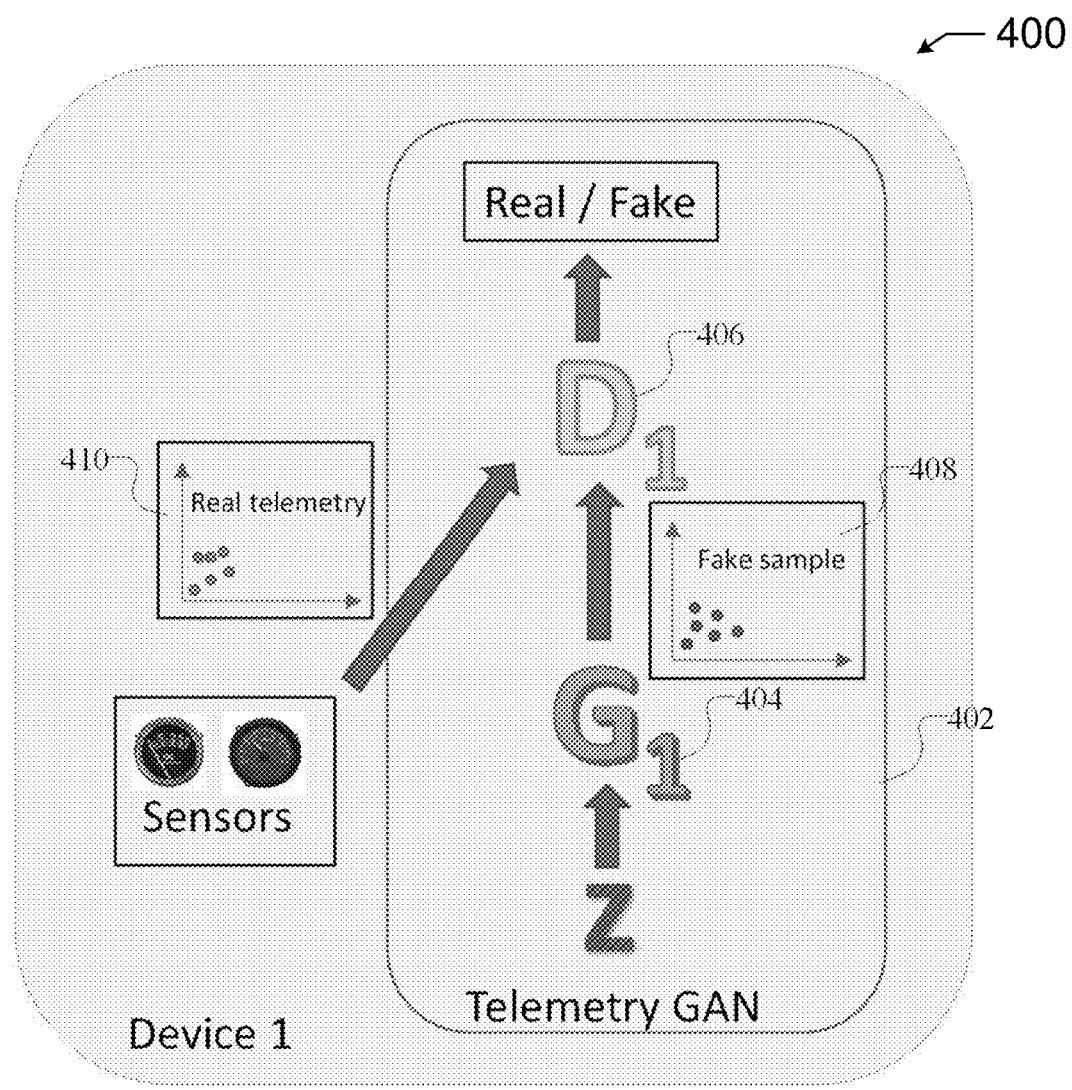
FIG. 4 illustrates a flow for training an example GAN model.

The first GAN model 308 and the second GAN model 310 can be trained according to an applicable GAN model to create a generator of the corresponding first and second GAN models 308 and 310. Specifically, FIG. 4 illustrates a flow 400 for training an example GAN model 402. The flow 400 shown in FIG. 4 can be used to train an applicable GAN model, such as the first GAN model 308 and the second GAN model 310.

The GAN model 402 includes a generator ($G_1$) 404 and a discriminator ($D_1$) 406. The input to the generator 404 is a random number generator Z that generates random/pseudo-random numbers and feeds these random numbers to the generator 404. The generator 404 can then modify these random numbers to generate fake samples 408 that are fed to the discriminator 406. Additionally, the discriminator 406 can receive real telemetry data 410 generated by a modeled device, e.g. IoT device, used to train the GAN model 402.

The discriminator 406 can then compare the fake samples 408 received from the generator 404 with the real telemetry data 410 received from the modeled device. In comparing the fake samples 408 received from the generator 404 with the real telemetry data 410, the discriminator 406 can determine, or otherwise attempt to determine, whether the received data is actually fake sample data or real telemetry data agnostic as to the source of the received data. Specifically, the discriminator 406 can attempt to identify the differences between the real telemetry data 410 and the fake samples 408 to attempt to separate the fake samples 408 from the real telemetry data 410.

Simultaneously/semi-simultaneously, the generator 404 can learn a model of a state of the modeled device to attempt to fool the discriminator 406 into thinking the fake samples 408 are actually real telemetry data 410 of the modeled device. Specifically, the generator 404 can receive feedback from the discriminator 406 related to the discriminator 406 being tricked into thinking the fake samples 408 are actually in the real telemetry data 410. For example, the discriminator 406 can provide feedback indicating the fake samples 408 that the discriminator 406 actually identified as fake data when compared to the real telemetry data 410. In turn, the generator 404 can change how it modifies the random/pseudo random numbers generated by Z, e.g. model the actual behavior of the modeled device, to further try to trick the discriminator 406

The loop of the discriminator 406 providing feedback to the generator 404 and the generator 404 further refining the fake samples 408/modeling the actual behavior of the modeled device can continue until equilibrium is reached. Specifically, equilibrium can be reached when the discriminator 406 can no longer determine which of the fake samples 408/a threshold number of the fake samples 408 provided by the generator 404 are actually fake samples when compared to the real telemetry data 410.

The overall loop of the generator 404 providing the fake samples 408 to the discriminator 406 and the discriminator 406 comparing the fake samples 408 to the real telemetry data 410 can continue during operation of the device, even when equilibrium is reached. In turn this can allow for the generator 404 to model the behavior of the modeled device when the actual behavior of the modeled device changes. For example, when real telemetry data 410 of the modeled device changes, e.g. due to changed environmental/operating conditions of the modeled device, the generator 404 can further continue to adjust itself/model the device, until equilibrium is reached again.

Returning back to the environment 300 shown in FIG. 3, the first network edge device 302 can provide a generator of the first GAN model 308 back to the unified GAN training system 306. Similarly, the second network edge device 304 can provide a generator of the second GAN model 310 to the unified GAN training system 306. The unified GAN training system 306, as discussed previously, can be implemented remote from the first network edge device 302 and the second network edge device 304 and subsequently receive the generator of the first GAN model 308 and the generator of the second GAN model 310 remote from the first network edge device 302 and the second network edge device 304.

In sending the generator of the first GAN model 308 to the unified GAN training system 306, the first network edge device 302 can refrain from sending the telemetry data of a modeled computing node used to train the first GAN model 308 to the unified GAN training system 306. Similarly, in sending the generator of the second GAN model 310 to the unified GAN training system 306, the second network edge device 304 can refrain from sending the telemetry data of a modeled computing node used to train the second GAN model 310 to the unified GAN training system 306. This can eliminate or reduce security concerns associated with exposing telemetry data from computing nodes away from network edges.

Specifically and as discussed previously, telemetry data from computing nodes is typically used to monitor networks using machine learning. This is problematic when the networks are monitored from a centralized location. In particular, the telemetry data is typically sent from the computing node away from the edge of the network, potentially exposing the telemetry data, thereby presenting security concerns that often preclude device owners from sharing telemetry data with outside parties. In turn, this makes applying machine learning to monitor networks problematic, as often times monitoring networks using machine learning is accomplished with telemetry data describing device behavior that is generated at or near the devices. By sending the generator of the first GAN model 308 and the generator of the second GAN model 310 instead of the telemetry data actually used to train these generators, the security risks posed by sending the telemetry data away from the edge of the network are reduced or otherwise eliminated. Specifically, an attacker may be able to access the generators but still can't perform adversarial attacks on discriminators of the GAN models 308 and 310.

The first network edge device 302 and the second network edge device 304 can provide the corresponding generator of the first GAN model 308 and the generator of the second GAN model 310 according to set intervals. For example, the first network edge device 302 can provide a continuously trained generator of the first GAN model 308 to the unified GAN training system 306 every ten minutes.

Further, the first network edge device 302 and the second network edge device 304 can provide the corresponding generator of the first GAN model 308 and the generator of the second GAN model 310 in response to triggering events for pushing the generators from the first and second network edge devices 302 and 304. For example, the first network edge device 302 can push the generator of the first GAN model 308 to the unified GAN training system 306 in response to a triggering event. Further in the example, the second network edge device 304 can push the generator of the second GAN model 310 to the unified GAN training system 306 in response to a triggering event. The triggering events for pushing of the corresponding generators from the first network edge device 302 and the second network edge device 304 can be the same triggering event or different triggering events.

A triggering event for pushing a generator of a GAN model to the unified GAN training system 306 can depend on model parameters of the GAN model. Specifically, a generator of a GAN model can be pushed to the unified GAN training system 306 when model parameter values for training the GAN model deviate beyond a specific amount/threshold from previous model parameter values. For example, a GAN model can be trained on pressure data from a computing node. Further in the example, if the pressure data used to train the GAN model deviates beyond a threshold amount, e.g. two standard deviations, from previous pressure data used to train the GAN model, then the GAN model can be pushed to the unified GAN training system 306.

Figure 5:
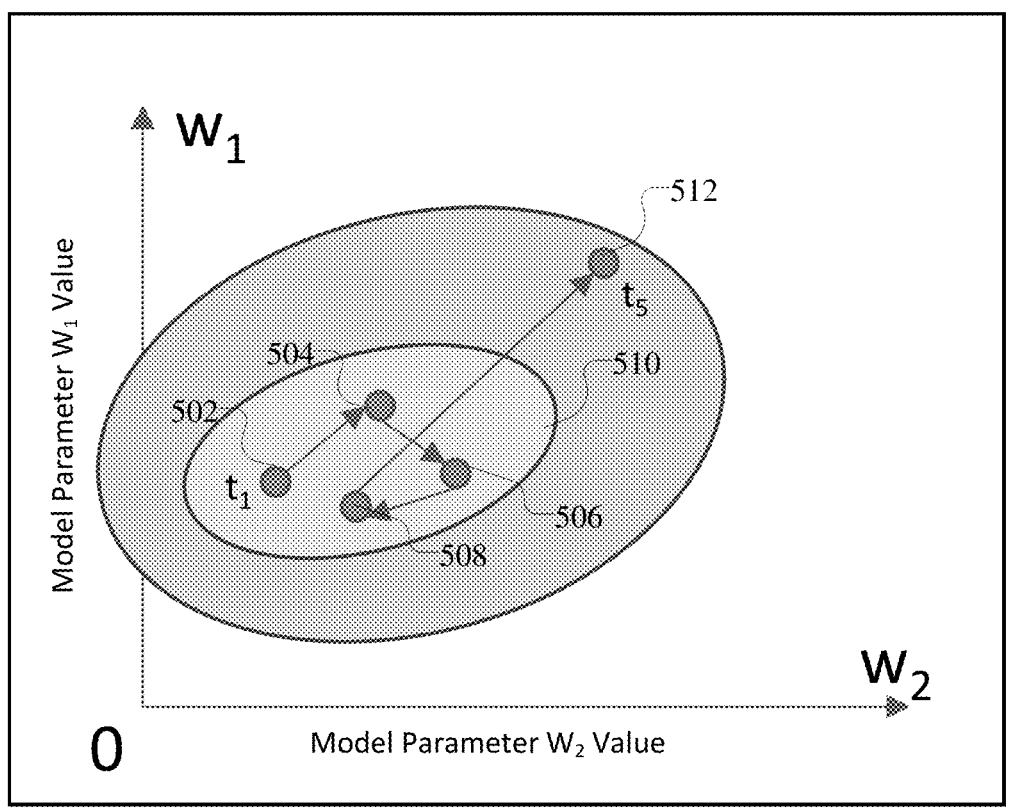
FIG. 5 shows a graph of values of model parameters for determining when to push a GAN model from a network edge device to an applicable destination according to a triggering event.

FIG. 5 shows a graph 500 of mapped values of model parameters for determining when to push a GAN model from a network edge device to an applicable destination, e.g. to the unified GAN training system 306, according to a triggering event. The graph 500 includes mappings of first model parameter $W_1$ values and second model parameter $W_2$ values into a multidimensional space. Specifically, the first model parameter $W_1$ values and the second model parameter $W_2$ values at various training steps, e.g. at specific times in training the GAN model, are mapped into the multidimensional space. For example, if a computing node used to train a GAN model measures water temperature and water pressure flow, then measured water temperatures and water pressures, at various times corresponding to various training steps, can be mapped to a multidimensional space. Specifically, in the graph 500 shown in FIG. 5, $W_1$ can represent water temperature and $W_2$ can represent water pressure as model parameters of the GAN model. Accordingly, a water temperature measurement at a specific time can be mapped along the $W_1$ axis, and a water pressure measurement at the specific time can be mapped along the $W_2$ axis to map the values of the model parameters at a training step corresponding to the specific time.

In the graph 500, at a first training step ($t_1$) 502, the values of the model parameters $W_1$ and $W_2$ are mapped into the multidimensional space. Similarly, at a second training step 504, a third training step 506, and a fourth training step 508, the values of the model parameters $W_1$ and $W_2$, corresponding to each training step, are mapped into the multidimensional space. As shown in the graph 500, the values of the model parameters and corresponding mappings at the first training step 502, the second training step 504, the third training step 506, and the fourth training step 508, stay within a specific region 510 within the multidimensional space. The region 510 can be a threshold model parameter value region that is pre-defined or defined based on mappings of model parameter values to the multidimensional space during previous training steps. Specifically, the region 510 can represent a standard deviation amount of model parameter values during a group of training steps.

Further, in the graph 500, at a fifth training step ($t_5$) 512, the values of the model parameters, corresponding to the mapping into the multidimensional space of the fifth training step 512, falls outside of the region 510. Specifically, the values of the model parameters at the fifth training step 512 fall outside of a standard deviation of values of the model parameters at the previous first, second, third, and fourth training steps 502, 504, 506, and 508. In turn, this large discrepancy between the values of the model parameters at the fifth training step 512 and the previous training steps 502, 504, 506, and 508 can correspond to a triggering event for pushing the GAN model/generator from a network edge device, e.g. where the GAN model is trained. For example, in response to the mapping of the fifth training step 512 falling out of the region 510, the generator of the GAN model can be pushed from the network edge device to an applicable system, such as the unified GAN training system 306.

Pushing the GAN model/generator based on a comparison of mappings of model parameter values at different training steps can account for problems associated with pushing the GAN model/generator in response to falsely detected anomalies. Specifically, anomaly detection is plagued by high rates of false positives. One way to combat this problem is to utilize more accurate behavior and anomaly detection models that are trained on more diverse data. However, when a single device is being monitored and/or devices are being monitored on-premise, e.g. at the edge of the network, diversity in training data is often limited, thereby increasing the chances of false positive anomaly detections when training corresponding anomaly detection models. By pushing a GAN model/generator when significant changes in model parameter values are observed, e.g. more likely caused by true positive anomaly detections, the chances that the GAN model/generator will be pushed in response to false positive anomaly detections, e.g. minor fluctuations in model parameter values, are reduced.

Additionally, pushing the GAN model/generator based on a comparison of mappings of model parameter values at different training steps can reduce computational resources used by an overall network monitoring system. Specifically, networks incorporating computing nodes, e.g. IoT devices, often include a large number of monitored devices. Pulling GAN models/generators frequently for these computing nodes increases the amount of computational resources needed to process the GAN models/generators to unfeasible levels. Further, this also increases the length of aggregation cycles to the point where unified GAN models created from the pulled GAN models/generators are obsolete with respect to newly created telemetry data at the computing nodes. Pushing the GAN models/generators less frequently based on a comparison of mappings of model parameter values at different training steps, as opposed to pushing the models whenever minor fluctuations in model parameter values are observed, makes implementation of GAN-based network device monitoring in large networks more feasible.

Returning back to the environment 300 shown in FIG. 3, the unified GAN training system 306 functions to generate a unified GAN model 312. The unified GAN model 312, as will be discussed in greater detail later, can be deployed to other network edge devices, e.g. different network edge devices from the first network edge device 302 and the network edge device 304, for purposes of detecting anomalies in device operation.

Figure 6:
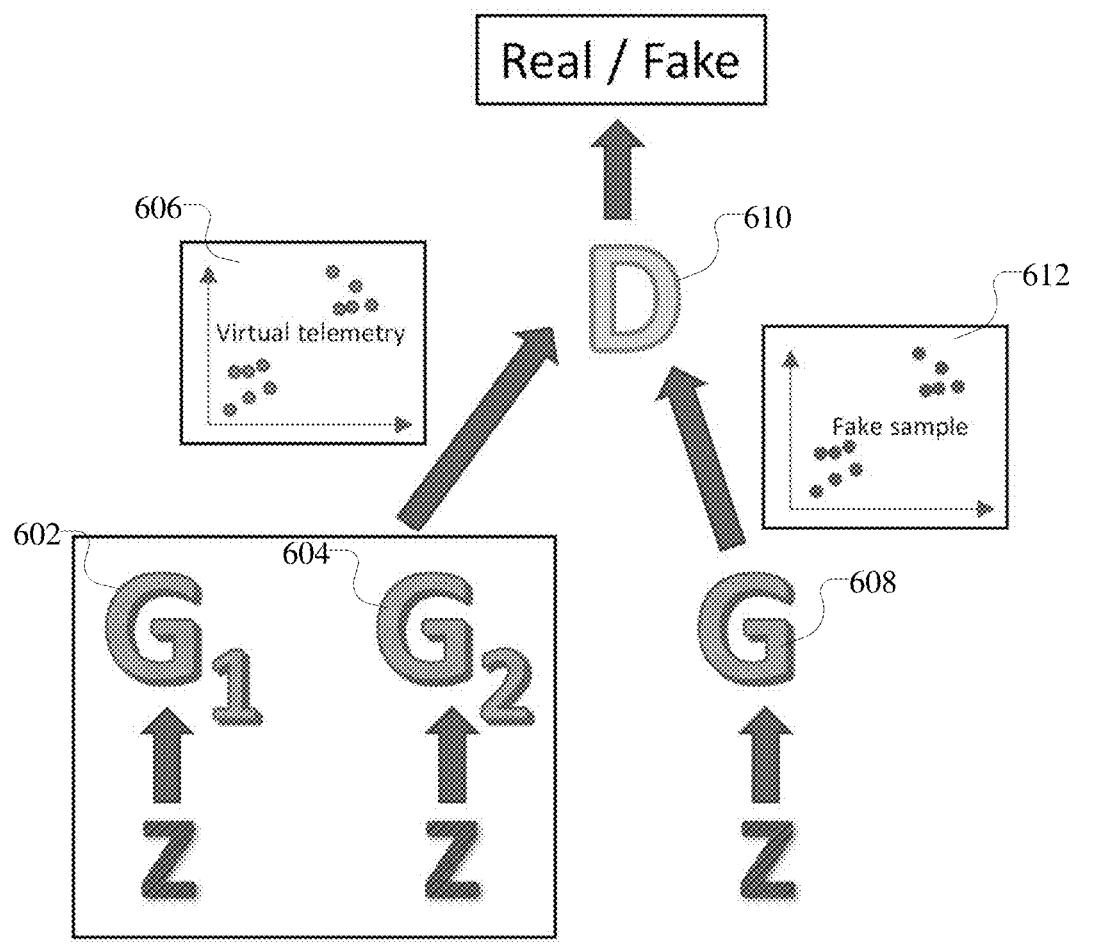
FIG. 6 illustrates a flow by which generators for different GAN models can be combined to generate a unified GAN model.

The unified GAN training system 306 can generate the unified GAN model 312 using the generator of the first GAN model 308 received from the first network edge device 302 and the generator of the second GAN model 310 received from the second network edge device 304. FIG. 6 illustrates a flow 600 by which generators for different GAN models can be combined to form a unified GAN model. The example flow 600 shown in FIG. 6 can be utilized by the unified GAN training system 306 to generate the unified GAN model 312.

In the flow 600, a first generator 602 and a second generator 604 are received. The first generator 602 and the second generator 604 can be combined to form virtual telemetry data 606 of modeled computing nodes, e.g. IoT devices. The virtual telemetry data 606 is virtual because the generators 602 and 604 are not the actual telemetry data generated by the computing nodes, but instead are trained to replicate the telemetry data of the computing nodes through GAN models.

The first generator 602 is merged with the second generator 604 to form the virtual telemetry data 606, despite the differences between the data in the first generator 602 and the data in the second generator 604. FIGS. 7A and 7B illustrate data graphs 700 and 702 of two different generators combined to form virtual telemetry data for training a unified GAN model. In each data graph 700 and 702, the data is mapped as values of packets per second ("PPS") verses average queue length of a TX buffer ("Queue len"). In this example, device 1, corresponding to data graph 700, is set up in the environment with relatively low load, so a GAN model captures the state of having low PPS and a short queue as "normal". Device 2, corresponding to data graph 702, however, is deployed in a different environment with a higher load. Both devices are of same type and could be used interchangeably, however the discrepancies in the data of the generators shown in FIGS. 7A and 7B are due to the different environments in which the devices operate. Despite the discrepancies in the data, the data of the first device/generator can be aggregated with the data of the second device/generator to form a single group of aggregated virtual telemetry data. In turn, a unified GAN can be trained based on the aggregated virtual telemetry data despite the large differences in the data.

Returning back to the flow 600 shown in FIG. 6, the unified GAN model includes a unified GAN generator 608 and a unified GAN discriminator 610. Similar to the flow 400 for training a GAN model shown in FIG. 4, the input to the unified GAN generator 608 is a random number generator Z that generates random/pseudo-random numbers and feeds these random numbers to the unified GAN generator 608. The unified GAN generator 608 can then modify these random numbers to generate fake samples 612 that are fed to the unified GAN discriminator 610. Additionally, the unified GAN discriminator 610 can receive the virtual telemetry data 606 generated by merging the first generator 602 and the second generator 604.

The unified GAN discriminator 610 can then compare the fake samples 612 received from the unified GAN generator 608 with the virtual telemetry data 606. In comparing the fake samples 612 received from the unified GAN generator 608 with the virtual telemetry data 606, the unified GAN discriminator 610 can determine, or otherwise attempt to determine, whether the data is actually fake sample data or virtual telemetry data agnostic as to the source of the data. Specifically, the unified GAN discriminator 610 can attempt to identify the differences between the virtual telemetry data 606 and the fake samples 612 to attempt to separate the virtual telemetry data 606 from the fake samples 612.

Simultaneously/semi-simultaneously, the unified GAN generator 608 can learn a model of a state of the devices modeled to create the first generator 602 and the second generator 604 to attempt to fool the unified GAN discriminator 610 into thinking the fake samples 612 are actually virtual telemetry data 606 of the first and second generators 602 and 604. Specifically, the unified GAN generator 608 can receive feedback from the unified GAN discriminator 610 related to the unified GAN discriminator 610 being tricked into thinking the fake samples 612 are actually in the virtual telemetry data 606. For example, the unified GAN discriminator 610 can provide feedback indicating the fake samples 612 that the unified GAN discriminator 610 actually identified as fake data when compared to the virtual telemetry data 606. In turn, the unified GAN generator 608 can further try to trick the unified GAN discriminator 610 into thinking the fake samples 612 are actually the virtual telemetry data. Specifically, the unified GAN generator 608 can change how it modifies the random/pseudo random numbers generated by Z, e.g. model the behavior of the devices used to generate the first generator 602 and the second generator 602, to further try to trick the unified GAN discriminator 610.

The loop of the unified GAN discriminator 610 providing feedback to the unified GAN generator 608 and the unified GAN generator 608 further refining the fake sample data 612 can continue until equilibrium is reached. Specifically, equilibrium can be reached when the unified GAN discriminator 610 can no longer determine which of the fake samples 612/a threshold number of the fake samples 612 provided by the unified GAN generator 608 are actually fake samples when compared to the virtual telemetry data 606.

Returning back to FIG. 3, the environment includes a third network edge device 314. The third network edge device 314 can be of the same device type as either or both the first network edge device 302 and the second network edge device 304. For example, third network edge device 314, the first network edge device 302, and the second network edge device 304 can all be the same type of smart phone. Additionally, the third network edge device 314 can be of the same device type as a device modeled by either or both the first GAN model 308 and the second GAN model 310.

The unified GAN training system 306 functions to deploy the unified GAN model 312, e.g. trained according to the flow 600 shown in FIG. 6, to the third network edge device 314. Subsequently, the unified GAN model 312 can be utilized to monitor network performance, e.g. by detecting anomalies in network operation of the third network edge device 314. Further, the unified GAN model 312 can be utilized by the third network edge device 314 to monitor network performance of a device associated with the third network edge device 314, e.g. by detecting anomalies in network operation of the device associated with the third network edge device 314.

The overall flow discussed with respect to the environment 300 shown in FIG. 3 can be repeated. Specifically, the first network edge device 302 and the second network edge device 304 can create updated generators of the first GAN model 308 and the second GAN model 310 using additional real telemetry data. Subsequently, the first network edge device 302 and the second network edge device 304 can send the updated generators of the first GAN model 308 and the second GAN model 310 to the unified GAN training system 306. The unified GAN training system 306 can then use the updated generators of the first GAN model 308 and the second GAN model 310 to generate an updated unified GAN model 312. The updated unified GAN model 312 can then be deployed to the third network edge device 314 for purposes of performing network monitoring, e.g. through anomaly detection.

FIG. 8 illustrates a flowchart for an example method of distributing machine learning to a network edge for monitoring operation of devices in a network. The method shown in FIG. 8 is provided by way of example, as there are a variety of ways to carry out the method. Additionally, while the example method is illustrated with a particular order of steps, those of ordinary skill in the art will appreciate that FIG. 8 and the modules shown therein can be executed in any order and can include fewer or more modules than illustrated.

Each module shown in FIG. 8 represents one or more steps, processes, methods or routines in the method.

At step 800, a first GAN model is deployed to a first network edge device. The first GAN model can be used to model behavior of the first network edge device or a device associated with the first network edge device, e.g. a computing node coupled to the first network edge device. Additionally, at step 800, a second GAN model is deployed to a second network edge device. The second GAN model can be used to model behavior of the second network edge device or a device associated with the second network edge device.

At step 802, the generator of the first GAN model and the generator of the second GAN model are received from the corresponding first network edge device and second network edge device. The generator of the first GAN model can be trained based on real telemetry data and the generator of the first GAN model can be transmitted without transmitting the real telemetry data used to train the generator. Similarly, the generator of the second GAN model can be trained based on real telemetry data and the generator of the second GAN model can be transmitted without transmitting the real telemetry data used to train the generator.

At step 804, a unified generator of a unified GAN model is trained using the generator of the first GAN model and the generator of the second GAN model. The unified generator can be trained at an applicable system, such as the unified GAN training system 306.

At step 806, the unified GAN model is deployed to a third computing node, e.g. IoT device, for monitoring operation of the third computing node. Specifically, the unified GAN model can be deployed to the third computing node for detecting anomalies in the operation of the third computing node in a network environment.

The disclosure now turns to FIGS. 9 and 10, which illustrate example network devices and computing devices, such as switches, routers, load balancers, client devices, and so forth.

FIG. 9 illustrates a computing system architecture 900 wherein the components of the system are in electrical communication with each other using a connection 905, such as a bus. Exemplary system 900 includes a processing unit (CPU or processor) 910 and a system connection 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the actual processor design. The processor 910 may be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include services 932, 934, 936 for controlling the processor 910. Other hardware or software modules are contemplated. The storage device 930 can be connected to the system connection 905. In one aspect, a hardware module that performs a particular function can include the software component stored in a computer-readable medium in connection with the necessary hardware components, such as the processor 910, connection 905, output device 935, and so forth, to carry out the function.

FIG. 10 illustrates an example network device 1000 suitable for performing switching, routing, load balancing, and other networking operations. Network device 1000 includes a central processing unit (CPU) 1004, interfaces 1002, and a bus 1010 (e.g., a PCI bus). When acting under the control of appropriate software or firmware, the CPU 1004 is responsible for executing packet management, error detection, and/or routing functions. The CPU 1004 preferably accomplishes all these functions under the control of software including an operating system and any appropriate applications software. CPU 1004 may include one or more processors 1008, such as a processor from the INTEL X86 family of microprocessors. In some cases, processor 1008 can be specially designed hardware for controlling the operations of network device 1000. In some cases, a memory 1006 (e.g., non-volatile RAM, ROM, etc.) also forms part of CPU 1004. However, there are many different ways in which memory could be coupled to the system.

The interfaces 1002 are typically provided as modular interface cards (sometimes referred to as "line cards"). Generally, they control the sending and receiving of data packets over the network and sometimes support other peripherals used with the network device 1000. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 1004 to efficiently perform routing computations, network diagnostics, security functions, etc.

Although the system shown in FIG. 10 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 1000.

Regardless of the network device's configuration, it may employ one or more memories or memory modules (including memory 1006) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 1006 could also hold various software containers and virtualized execution environments and data.

The network device 1000 can also include an application-specific integrated circuit (ASIC), which can be configured to perform routing and/or switching operations. The ASIC can communicate with other components in the network device 1000 via the bus 1010, to exchange data and signals and coordinate various types of operations by the network device 1000, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
deploying a first generative adversarial network (GAN) model to a first network edge device and a second GAN model to a second network edge device, wherein a generator of the first GAN model is trained using real telemetry data of a first computing node and a generator of the second GAN model is trained using real telemetry data of a second computing node;
receiving, from the first network edge device, the generator of the first GAN model, wherein the generator of the first GAN model is pushed from the first network edge device in response to a first triggering event corresponding to values of one or more model parameters of the first GAN model changing by a threshold amount during training of the first GAN model;
receiving, from the second network edge device, the generator of the second GAN model, wherein the generator of the second GAN model is pushed from the second network edge device in response to a second triggering event corresponding to values of one or more model parameters of the second GAN model changing by another threshold amount during training of the second GAN model;
training a unified generator of a unified GAN model using the generator of the first GAN model and the generator of the second GAN model; and
deploying the unified GAN model to a third computing node for monitoring operation of the third computing node.

2. The method of claim 1, detecting anomalies in the operation of the third computing node using the unified GAN model.

3. The method of claim 1, wherein the first computing node is the first network edge device and the generator of the first GAN model is trained at the first computing node.

4. The method of claim 1, wherein the second computing node is the second network edge device and the generator of the second GAN model is trained at the second computing node.

5. The method of claim 1, wherein the generator of the first GAN model and the generator of the second GAN model are received at one or more remote computing devices from the first network edge device and the second network edge device, and the one or more remote computing devices are configured to train the unified generator of the unified GAN model remote from the first network edge device and the second network edge device.

6. The method of claim 5, wherein the one or more remote computing devices are configured to receive the generator of the first GAN model and the generator of the second GAN model without receiving the real telemetry data of the first computing node used to train the generator of the first GAN model and the real telemetry data of the second computing node used to train the generator of the second GAN model.

7. The method of claim 1, wherein the generator of the first GAN model and the generator of the second GAN model form virtual telemetry data of the first computing node and the second computing node and the virtual telemetry data is provided to a discriminator of the unified GAN model to train the unified generator of the unified GAN model.

8. The method of claim 1, wherein the first computing node, the second computing node and the third computing node are a same computing node type.

9. The method of claim 8, wherein the first computing node and the second computing node operate in different environments to generate the real telemetry data of the first computing node and the real telemetry data of the second computing node.

10. The method of claim 1, further comprising:
mapping the one or more model parameters of the first GAN model into a first multidimensional space after a training step of a plurality of training steps of the first GAN model;
determining whether values of the one or more model parameters of the first GAN model changed by the threshold amount corresponding to the first triggering event using a mapping of the one or more model parameters of the first GAN model into the first multidimensional space;
mapping the one or more model parameters of the second GAN model into a second multidimensional space after a training step of a plurality of training steps of the second GAN model; and
determining whether values of the one or more model parameters of the second GAN model changed by the threshold amount corresponding to the second triggering event using a mapping of the one or more model parameters of the second GAN model into the second multidimensional space.

11. The method of claim 1, wherein the first GAN model is further trained using additional real telemetry data of the first computing node to generate an updated generator of the first GAN model and the second GAN model is further trained using additional real telemetry data of the second computing node to generate an updated generator of the second GAN model, the method further comprising:
receiving, from the first network edge device, the updated generator of the first GAN model;
receiving, from the second network edge device, the updated generator of the second GAN model; and
updating the unified generator of the unified GAN model using the updated generator of the first GAN model and the updated generator of the second GAN model to create an updated unified generator of an updated unified GAN model.

12. The method of claim 11, further comprising deploying the updated unified GAN model to the third computing node.

13. A system comprising:
one or more processors; and at least one computer-readable storage medium having stored therein instructions which, when executed by the one or more processors, cause the one or more processors to perform operations comprising:

deploying a first generative adversarial network (GAN) model to a first network edge device and a second GAN model to a second network edge device, wherein a generator of the first GAN model is trained using real telemetry data of a first computing node and a generator of the second GAN model is trained using real telemetry data of a second computing node;

receiving, from the first network edge device, the generator of the first GAN model, wherein the generator of the first GAN model is pushed from the first network edge device in response to a first triggering event corresponding to values of one or more model parameters of the first GAN model changing by a threshold amount during training of the first GAN model;

receiving, from the second network edge device, the generator of the second GAN model, wherein the generator of the second GAN model is pushed from the second network edge device in response to a second triggering event corresponding to values of one or more model parameters of the second GAN model changing by another threshold amount during training of the second GAN model; and training a unified generator of a unified GAN model using the generator of the first GAN model and the generator of the second GAN model.

14. The system of claim 13, wherein the generator of the first GAN model and the generator of the second GAN model are received at one or more remote computing devices from the first network edge device and the second network edge device, and the one or more remote computing devices are configured to train the unified generator of the unified GAN model remote from the first network edge device and the second network edge device.

15. The system of claim 14, wherein the one or more remote computing devices are configured to receive the generator of the first GAN model and the generator of the second GAN model without receiving the real telemetry data of the first computing node used to train the generator of the first GAN model and the real telemetry data of the second computing node used to train the generator of the second GAN model.

16. The system of claim 13, wherein the instructions which, when executed by the one or more processors, further cause the one or more processors to perform operations comprising:

mapping the one or more model parameters of the first GAN model into a first multidimensional space after a training step of a plurality of training steps of the first GAN model;

determining whether values of the one or more model parameters of the first GAN model changed by the threshold amount corresponding to the first triggering event using a mapping of the one or more model parameters of the first GAN model into the first multidimensional space;

mapping the one or more model parameters of the second GAN model into a second multidimensional space after a training step of a plurality of training steps of the second GAN model; and determining whether values of the one or more model parameters of the second GAN model changed by the threshold amount corresponding to the second triggering event using a mapping of the one or more model parameters of the second GAN model into the second multidimensional space.

17. A non-transitory computer-readable storage medium having stored therein instructions which, when executed by a processor, cause the processor to perform operations comprising:

deploying a first generative adversarial network (GAN) model to a first network edge device and a second GAN model to a second network edge device, wherein a generator of the first GAN model is trained using real telemetry data of a first Internet of Things (IoT) device and a generator of the second GAN model is trained using real telemetry data of a second IoT device;

receiving, from the first network edge device, the generator of the first GAN model, wherein the generator of the first GAN model is pushed from the first network edge device in response to a first triggering event corresponding to values of one or more model parameters of the first GAN model changing by a threshold amount during training of the first GAN model;

receiving, from the second network edge device, the generator of the second GAN model, wherein the generator of the second GAN model is pushed from the second network edge device in response to a second triggering event corresponding to values of one or more model parameters of the second GAN model changing by another threshold amount during training of the second GAN model;

training a unified generator of a unified GAN model using the generator of the first GAN model and the generator of the second GAN model; and deploying the unified GAN model to a third IoT device for detecting anomalies during operation of the third IoT device.

* * * * *